(12) United States Patent
Jung et al.

(10) Patent No.: US 10,279,674 B2
(45) Date of Patent: May 7, 2019

(54) WHEEL DRIVING SYSTEM FOR CONSTRUCTION MACHINERY

(71) Applicant: DOOSAN INFRACORE CO., LTD., Incheon (KR)

(72) Inventors: Eun-Soo Jung, Yongin-si (KR); Chang-Hyun Kim, Suwon-si (KR); Dong-Mok Kim, Incheon (KR); Lee-Hyoung Cho, Suwon-si (KR)

(73) Assignee: DOOSAN INFRACORE CO., LTD., Incheon (KR)

( * ) Notice: Subject to any disclaimer, the term of this patent is extended or adjusted under 35 U.S.C. 154(b) by 111 days.

(21) Appl. No.: 15/313,967

(22) PCT Filed: May 26, 2015

(86) PCT No.: PCT/KR2015/005226
§ 371 (c)(1),
(2) Date: Nov. 25, 2016

(87) PCT Pub. No.: WO2015/182943
PCT Pub. Date: Dec. 3, 2015

(65) Prior Publication Data
US 2017/0136871 A1      May 18, 2017

(30) Foreign Application Priority Data

May 27, 2014  (KR) .................. 10-2014-0063772

(51) Int. Cl.
*B60K 6/547*         (2007.10)
*B60K 6/52*          (2007.10)
(Continued)

(52) U.S. Cl.
CPC ................. *B60K 6/52* (2013.01); *B60K 6/22* (2013.01); *B60K 6/26* (2013.01); *B60K 6/547* (2013.01);
(Continued)

(58) Field of Classification Search
CPC .......... B60K 6/52; B60K 6/547; B60K 17/06; B60K 17/35; B60Y 2200/41; B60Y 2200/92; B60Y 2400/80; B60Y 2400/82
See application file for complete search history.

(56) References Cited

U.S. PATENT DOCUMENTS 6,005,358 A  * 12/1999 Radev ................. B60K 17/356
                                                  180/65.7
6,427,797 B1 *  8/2002 Chang ..................... B60K 1/00
                                                  180/233
(Continued)

FOREIGN PATENT DOCUMENTS

JP    2010-149811    *  7/2010  .......... B60K 17/356
JP    2010-149811  A     7/2010
(Continued)

OTHER PUBLICATIONS

International Search Report for PCT/KR2015/005226 dated Aug. 19, 2015.
(Continued)

*Primary Examiner* — Joseph M Rocca
*Assistant Examiner* — Michael R Stabley
(74) *Attorney, Agent, or Firm* — Hauptman Ham, LLP

(57) ABSTRACT

A wheel driving system includes a generator connected to an engine and configured to generate electrical energy, a front axle configured to drive a front wheel and including a front electric motor configured to produce a driving torque and a front transmission configured to convert the driving torque into a conversion torque and transmit the conversion torque to the front wheel via a front drive shaft, a rear axle configured to drive a rear wheel and including a rear electric motor configured to produce a driving torque and a rear transmission configured to convert the driving torque into a conversion torque and transmit the conversion torque to the rear wheel via a rear drive shaft, and a central connection
(Continued)

unit operatively connected to the front drive shaft and the rear drive shaft and configured to transmit the conversion torque between the front axle and the rear axle.

9 Claims, 4 Drawing Sheets

(51) Int. Cl.
| | |
|---|---|
| *B60K 6/22* | (2007.10) |
| *B60K 6/26* | (2007.10) |
| *B60W 10/14* | (2012.01) |
| *F16H 61/04* | (2006.01) |
| *B60K 17/06* | (2006.01) |
| *B60K 17/35* | (2006.01) |
| *B60K 7/00* | (2006.01) |
| *B60K 17/16* | (2006.01) |
| *B60K 17/356* | (2006.01) |
| *B60K 23/08* | (2006.01) |
| *F16H 61/02* | (2006.01) |
| *B60K 1/04* | (2019.01) |
| *B60K 17/04* | (2006.01) |

(52) U.S. Cl.
CPC ............ *B60K 7/0007* (2013.01); *B60K 17/06* (2013.01); *B60K 17/165* (2013.01); *B60K 17/35* (2013.01); *B60K 17/356* (2013.01); *B60K 23/0808* (2013.01); *B60W 10/14* (2013.01); *F16H 61/0213* (2013.01); *F16H 61/04* (2013.01); *B60K 1/04* (2013.01); *B60K 17/043* (2013.01); *B60K 2007/0061* (2013.01); *B60Y 2200/41* (2013.01); *B60Y 2200/91* (2013.01); *B60Y 2200/92* (2013.01); *B60Y 2400/204* (2013.01); *B60Y 2400/61* (2013.01); *B60Y 2400/80* (2013.01); *B60Y 2400/82* (2013.01); *Y10S 903/916* (2013.01); *Y10S 903/919* (2013.01)

(56) References Cited

U.S. PATENT DOCUMENTS

| | | | |
|---|---|---|---|
| 7,287,612 B2 | 10/2007 | Tarasinski et al. | |
| 8,083,016 B2* | 12/2011 | Naik | B60K 6/365 180/242 |
| 8,738,207 B2* | 5/2014 | Holmes | B60K 6/24 180/65.265 |
| 8,965,609 B2* | 2/2015 | Takagi | G05D 17/02 180/197 |
| 2008/0182712 A1* | 7/2008 | Kira | B60K 6/26 477/7 |
| 2013/0289810 A1 | 10/2013 | Holmes et al. | |
| 2014/0374211 A1* | 12/2014 | Date | B60K 6/387 192/85.01 |

FOREIGN PATENT DOCUMENTS

| | | |
|---|---|---|
| JP | 2010-233403 A | 10/2010 |
| JP | 2013-180680 A | 9/2013 |

OTHER PUBLICATIONS

International Search Report dated Aug. 19, 2015 for PCT/KR2015/005226.

* cited by examiner

WHEEL DRIVING SYSTEM FOR CONSTRUCTION MACHINERY

CROSS REFERENCE TO RELATED APPLICATION

This application is the National Phase application of International Application No. PCT/KR2015/005226, filed May 26, 2015, which is based upon and claims the benefits of priorities under 35 U.S.C § 119(a) of Korean Patent Application No. 10-2014-0063772, filed on May 27, 2014 with the Korean Intellectual Property Office (KIPO), the entire contents of which are incorporated herein by reference.

BACKGROUND

1. Field

Example embodiments relate to a wheel driving system for construction machinery. More particularly, Example embodiments relate to a wheel driving system for hybrid construction machinery.

2. Description of the Related Art

Recently, researches on hybrid driving system using an engine and a generator as a power source have been increased. Because construction machinery including the hybrid driving system has to perform a high load work as well as a general drive, an electric motor respectively included in a front axle and a rear axle may be required to produce a wide range of torque from low torque to high torque.

Generally, the electric motor capable of producing high torque may be relatively big and heavy. Because the size and the volume of the construction machinery including these electric motors are increased, fuel efficiency and work efficiency of the construction machinery may be deteriorated.

Considering that a plurality of wheels of the construction machinery are driven by a plurality of the electric motors respectively, a new hybrid driving system capable of reduce loads applied on the electric motors and improving wheel driving efficiency may be required.

SUMMARY

Example embodiments provide a wheel driving system capable of improving wheel driving efficiency.

According to example embodiments, a wheel driving system includes a generator connected to an engine and configured to generate electrical energy, a front axle configured to drive at least one front wheel and including a front electric motor configured to produce a driving torque from the electrical energy supplied from the generator and a front transmission configured to convert the driving torque into a conversion torque required according to a speed of construction machinery and transmit the conversion torque to the front wheel via a front drive shaft, a rear axle configured to drive at least one rear wheel and including a rear electric motor configured to produce a driving torque from the electrical energy supplied from the generator and a rear transmission configured to convert the driving torque into a conversion torque required according to the speed of the construction machinery and transmit the conversion torque to the rear wheel via a rear drive shaft, and a central connection unit operatively connected to the front drive shaft and the rear drive shaft and configured to transmit the conversion torque between the front axle and the rear axle.

In example embodiments, the front transmission and the rear transmission may have at least two speed steps, and the front transmission may have a first shift ratio at a same speed step and the rear transmission may have a second shift ratio different from the first shift ratio at the same speed step.

In example embodiments, the first shift ratio may be greater than the second shift ratio.

In example embodiments, when the speed of the construction machinery reaches a first shift permissible speed, a speed step of the front transmission may be shifted, and when the speed of the construction machinery reaches a second shift permissible speed different from the first shift permissible speed, a speed step of the rear transmission may be shifted.

In example embodiments, the front transmission and the rear transmission may have at least two speed steps, and when the speed of the construction machinery ranges between a first shift permissible speed and a second shift permissible speed, the speed step of the front transmission is different from the speed step of the rear transmission.

In example embodiments, the front wheel may include a front left wheel and a front right wheel, and the front drive shaft may include a front left drive shaft connected to the front left wheel and a front right drive shaft connected to the front right wheel. The wheel driving system may further include a front drive shaft connection unit configured to connect the front left drive shaft and the front right drive shaft. The central connection unit may be operatively connected to the front drive shaft connection unit.

In example embodiments, the front drive shaft connection unit may include a differential gear.

In example embodiments, the rear wheel may include a rear left wheel and a rear right wheel, and the rear drive shaft comprises a rear left drive shaft connected to the rear left wheel and a rear right drive shaft connected to the rear right wheel. The wheel driving system may further include a rear drive shaft connection unit configured to connect the rear left drive shaft and the rear right drive shaft. The central connection unit may be operatively connected to the rear drive shaft connection unit.

In example embodiments, the rear drive shaft connection unit may include a differential gear.

When hybrid construction machinery performs a high load work, a load may be concentrated on a front axle or a rear axle of the construction machinery. Especially, in a forward excavation work state of a wheel loader, a traction work state of a tractor, etc, a load may be concentrated on the front axle, no load or a little load may be exerted on the rear axle. In this case, it may be preferable that the front axle and the rear axle include high capacity electric motors capable of producing high torque respectively. Accordingly, because the high capacity electric motors are relatively big and heavy, fuel efficiency and work efficiency of the construction machinery including the high capacity electric motors may be relatively low.

In a wheel driving system in accordance with example embodiments, light-weight and compact front and rear electric motors having a relatively low maximum output torque may be connected to front and rear transmissions respectively, and a low driving torque respectively generated by the front and rear electric motors may be converted into a high conversion torque such that a front wheel and a rear wheel are driven by the conversion torque. Accordingly, the weight and price of the construction machinery may be decreased, and fuel efficiency and work efficiency of the construction machinery may be improved. Additionally, because the front transmission and the rear transmission have different shift ratios, the wheel driving system may satisfy a traction load required for the construction machinery and perform the high load work without torque transfer interruption during shifts.

Even when the rear wheel driven by the rear axle does not exert the conversion torque on the ground, the conversion torque produced by the rear axle may be transmitted to the front axle through a central connection unit. Accordingly, the total load may be shared by the front electric motor and the rear electric motor, the loads exerted on each of the front electric motor and the rear electric motor may be reduced, and light-weight and compact electric motors having a relatively low maximum output torque may be used in the construction machinery. Thus, fuel efficiency and work efficiency of the construction machinery may be improved due to light weight.

BRIEF DESCRIPTION OF THE DRAWINGS

Example embodiments will be more clearly understood from the following detailed description taken in conjunction with the accompanying drawings.

DESCRIPTION OF EMBODIMENTS

Figure 1:
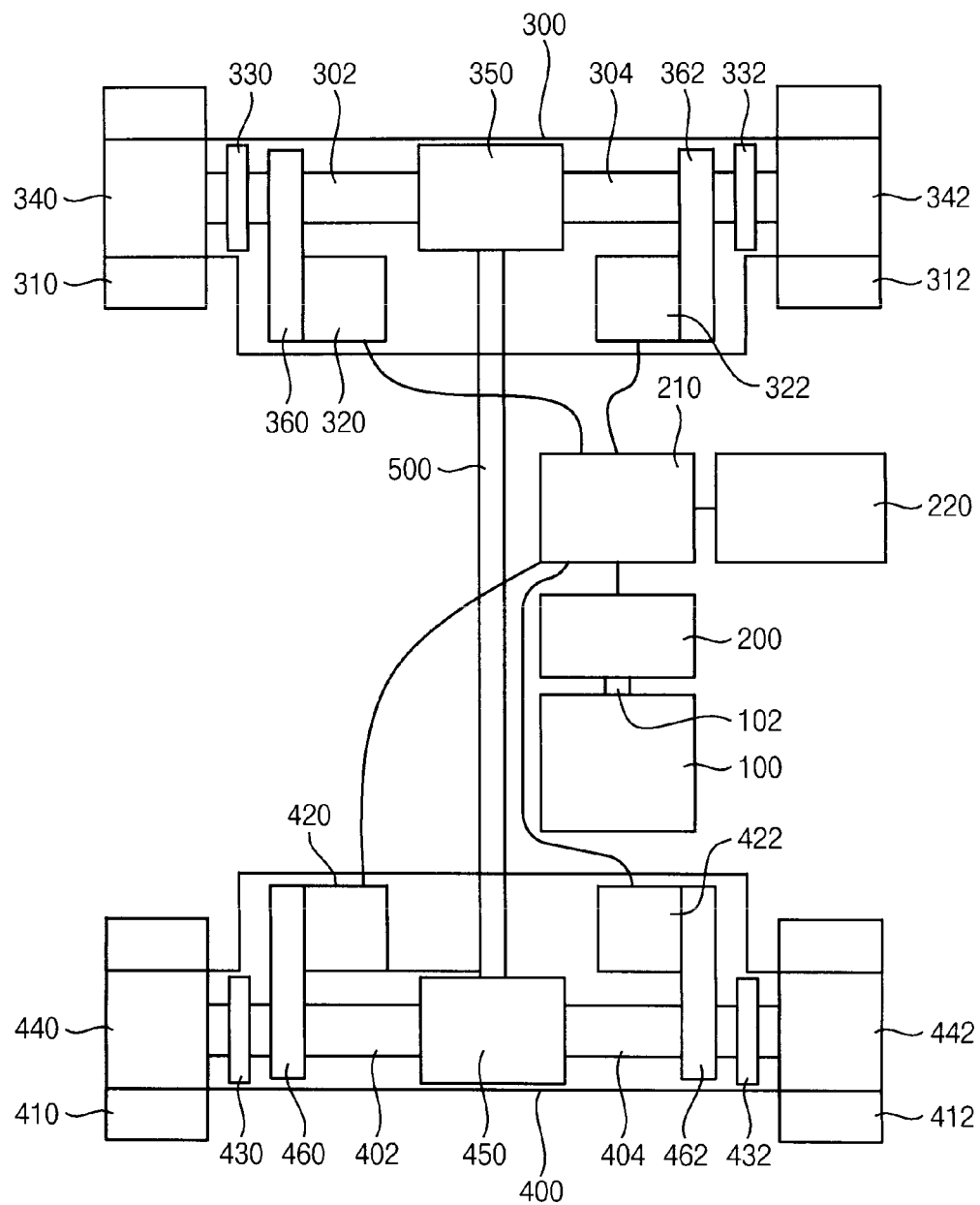
FIG. 1 is a diagrammatic view illustrating a wheel driving system in accordance with example embodiments.

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this description will be thorough and complete, and will fully convey the scope of the present inventive concept to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, fourth etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
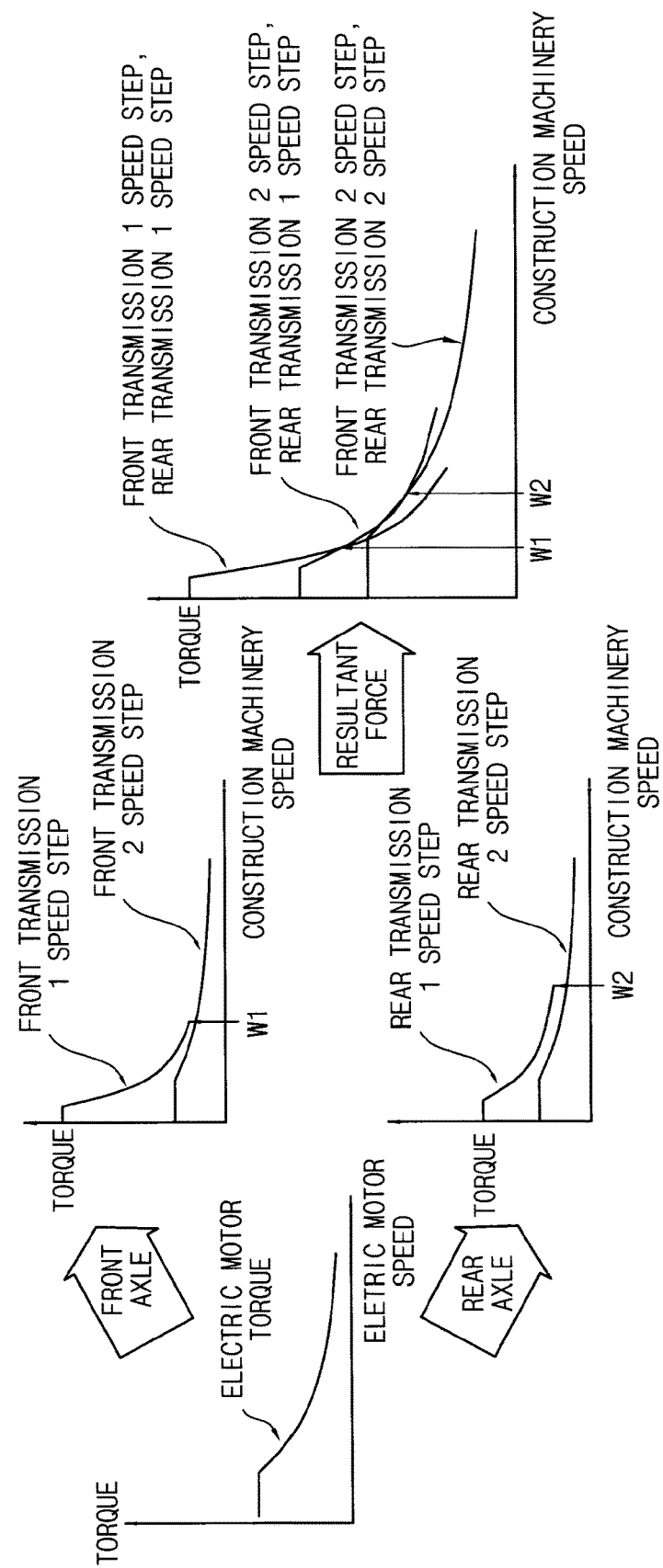
FIG. 2 is a graph illustrating torque versus speed of construction machinery including the wheel driving system in FIG. 1.
Figure 3:
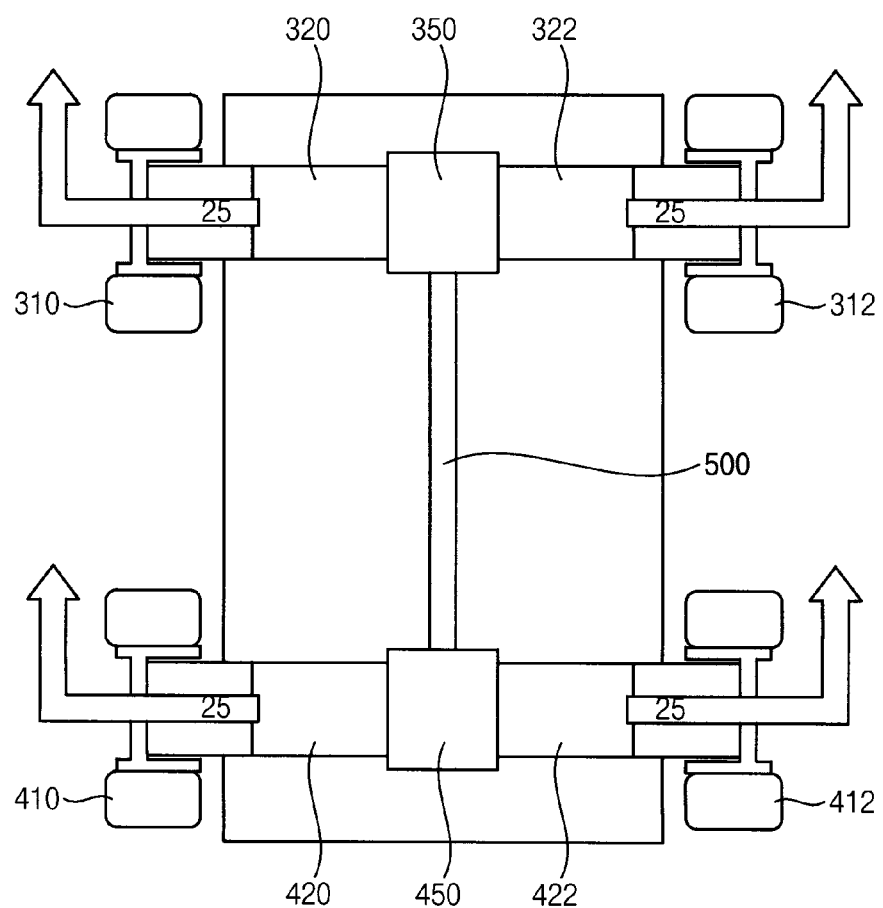
FIG. 3 is a diagrammatic view illustrating conversion torques exerted on the ground by each wheels of the wheel driving system in FIG. 1, while operating in a normal travel state.
Figure 4:
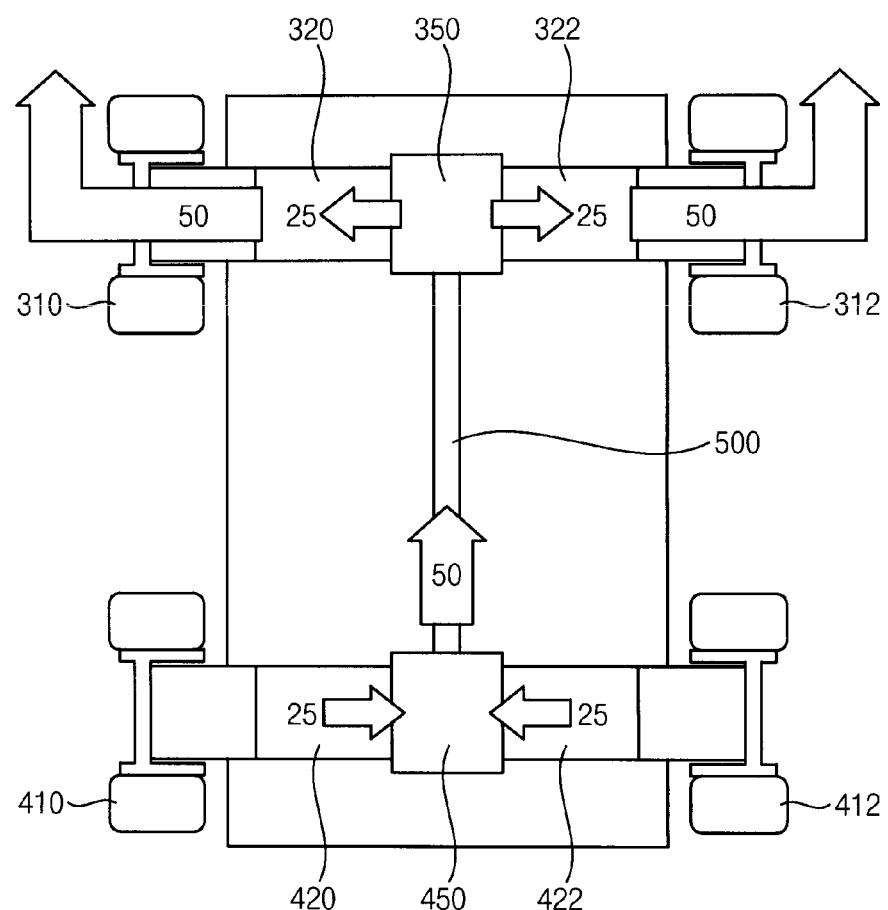
FIG. 4 is a diagrammatic view illustrating conversion torques exerted on the ground by each wheels of the wheel driving system in FIG. 1, while operating in a high load work state.

FIG. 1 is a diagrammatic view illustrating a wheel driving system in accordance with example embodiments. FIG. 2 is a graph illustrating torque versus speed of construction machinery including the wheel driving system in FIG. 1. FIG. 3 is a diagrammatic view illustrating conversion torques exerted on the ground by each wheels of the wheel driving system in FIG. 1, while operating in a normal travel state. FIG. 4 is a diagrammatic view illustrating conversion torques exerted on the ground by each wheels of the wheel driving system in FIG. 1, while operating in a high load work state.

Referring to FIGS. 1 to 4, a wheel driving system may include a generator 200 connected to an engine 100 and configured to generate electrical energy, a front axle 300 configured to drive at least one front wheel via a front drive shaft, a rear axle 400 configured to drive at least one rear wheel via a rear drive shaft, and a central connection unit 500 operatively connected to the front drive shaft and the rear drive shaft.

The front axle 300 may include a front electric motor configured to produce a driving torque from the electrical energy supplied from the generator 200 and a front transmission configured to convert the driving torque supplied from the front electric motor into a conversion torque according to a speed of construction machinery and transmit the conversion torque to the front wheel via the front drive shaft.

The rear axle 400 may include a rear electric motor configured to produce a driving torque from the electrical energy supplied from the generator 200 and a rear transmission configured to convert the driving torque supplied from the rear electric motor into a conversion torque according to a speed of the construction machinery and transmit the conversion torque to the rear wheel via the rear drive shaft.

In example embodiments, the front wheel may include a front left wheel 310 and a front right wheel 312, and the front drive shaft may include a front left drive shaft 302 connected to the front left wheel 310 and a front right drive shaft 304 connected to the front right wheel 312.

The front transmission may include a front left transmission 360 and a front right transmission 362, and the front electric motor may include a front left electric motor 320 and a front right electric motor 322.

The rear wheel may include a rear left wheel 410 and a rear right wheel 412, and the rear drive shaft may include a rear left drive shaft 402 connected to the rear left wheel 410 and a rear right drive shaft 404 connected to the rear right wheel 312.

The rear transmission may include a rear left transmission 460 and a rear right transmission 462, and the rear electric motor may include a rear left electric motor 420 and a rear right electric motor 422.

The engine 100 may burn a fuel to generate a driving force and transmit the driving force to the generator 200 through an engine output shaft 102. For example, the engine 100 may be a diesel engine. Alternatively, the engine 100 may be a liquefied natural gas (LNG) engine, a compressed natural gas (CNG) engine, an adsorbed natural gas (ANG) engine, a liquefied petroleum gas (LPG) engine, a gasoline engine, etc.

A hydraulic pump (not illustrated) may be connected to the engine output shaft 102 such that the hydraulic pump is driven by the driving force. The hydraulic pump may discharge a hydraulic pressure fluid to drive actuators in order to operate a work apparatus of construction machinery. For example, the work apparatus may include a boom, a bucket, etc.

The generator 200 may be driven by the engine 100 to produce the electrical energy using electromagnetic induction. For example, the generator 200 may include an alternating current generator or a direction current generator. The generator 200 may supply the electrical energy to the front axle 300 and the rear axle 400 through a combined inverter 210.

The combined inverter 210 may change direct current to alternating current or may change alternating current to direct current. The combined inverter 210 may change the form of the current to electrically connect the generator 200, the front axle 300 and the rear axle 400 to each other. The combined inverter 210 may connect the components to each other, to thereby improving spatial efficiency of the construction machinery. In particular, the combined inverter 210 may be connected to the generator 200, the front left electric motor 320 and the front right electric motor 322 of the front axle 300, and the rear left electric motor 420 and the rear right electric motor 422 of the rear axle 400. Alternatively, a plurality of individual inverters (not illustrated) may be provided respectively for the generator 200, the front left electric motor 320 and the front right electric motor 322 of the front axle 300, and the rear left electric motor 420 and the rear right electric motor 422 of the rear axle 400.

In example embodiments, the wheel driving system may further include an energy storage device 220 which is electrically connected to the generator 200, the front left electric motor 320 and the front right electric motor 322 of the front axle 300, and the rear left electric motor 420 and the rear right electric motor 422 of the rear axle 400 respectively, to store the electrical energy. For example, the energy storage device 220 may be electrically connected to the generator 200, the front left electric motor 320 and the front right electric motor 322 of the front axle 300, and the rear left electric motor 420 and the rear right electric motor 422 of the rear axle 400 respectively, through the combined inverter 210.

The energy storage device 220 may include a battery, a capacitor, etc. For example, when the construction machinery is accelerated, the energy storage device 220 may store any excess electrical energy from the generator 200 through the combined inverter 210. When the construction machinery is decelerated, the energy storage device 220 may store any excess electrical energy from the front left electric motor 320, the front right electric motor 322, the rear left electric motor 420, and the rear right electric motor 422. When the generator 200 does not stably generate the electrical energy due to unstable supply of the driving force from the engine 100, the energy storage device 220 may stably supply the electrical energy to the front left electric motor 320, the front right electric motor 322, the rear left electric motor 420, and the rear right electric motor 422.

The front axle 300 may drive the front left wheel 310 and the front right wheel 312, and may include the front electric motor 320 and the front right electric motor 322 configured to produce a driving torque from the electrical energy supplied from the generator 200, and the front left transmission 360 and the front right transmission 362 configured to convert the driving torque to a conversion torque required according to a speed of the construction machinery and transmit the conversion torque to the front left wheel 310 and the front right wheel 312 via the front left drive shaft 302 and the front right drive shaft 304 respectively.

For example, the front axle 300 may further include a front drive shaft connection unit 350 configured to connect the front left drive shaft 302 and the front right drive shaft 304.

The rear axle 400 may drive the rear left wheel 410 and the rear right wheel 412, and may include the rear electric motor 420 and the rear right electric motor 422 configured to produce a driving torque from the electrical energy supplied from the generator 200, and the rear left transmission 460 and the rear right transmission 462 configured to convert the driving torque to a conversion torque required according to a speed of the construction machinery and transmit the conversion torque to the rear left wheel 410 and the rear right wheel 412 via the rear left drive shaft 402 and the rear right drive shaft 404 respectively.

For example, the rear axle 400 may further include a rear drive shaft connection unit 450 configured to connect the rear left drive shaft 402 and the rear right drive shaft 404.

The front left electric motor 320, the front right electric motor 322, the rear left electric motor 420 and the rear right electric motor 422 may receive the electrical energy from the generator 200 through the combined inverter 210 and produce the driving torque respectively.

For example, the front left electric motor 320, the front right electric motor 322, the rear left electric motor 420 and the rear right electric motor 422 may include an alternating current electric motor or a direct current electric motor. The alternating current electric motor may be a three-phase motor. Alternatively, the direct current electric motor may be a single-phase motor.

The front left transmission 360, the front right transmission 362, the rear left transmission 460 and the rear right transmission 462 may convert the driving torque supplied from the front left electric motor 320, the front right electric motor 322, the rear left electric motor 420 and the rear right electric motor 422 into the conversion torque required according to a speed of construction machinery and drive the front left wheel 310, the front right wheel 312, the rear left wheel 410 and the rear right wheel 412 via the front left drive shaft 302, the front right drive shaft 304, the rear left drive shaft 402 and the rear right drive shaft 404, respectively.

The front left transmission 360, the front right transmission 362, the rear left transmission 460 and the rear right transmission 462 may include at least one clutch and at least one reduction gear, respectively. The clutch and the reduction gear may be arranged in a gear train. The front left transmission 360, the front right transmission 362, the rear left transmission 460 and the rear right transmission 462 may shift speed steps between predetermined speeds using the clutch, the reduction gear, etc. For example, the front left transmission 360, the front right transmission 362, the rear left transmission 460 and the rear right transmission 462 may have at least two speed steps, that is, first and second speeds, respectively.

In example embodiments, the front left transmission 360 and the front right transmission 362 may have a first shift ratio at a same speed step, and the rear left transmission 460 and the rear right transmission 462 may have a second shift ratio different from the first shift ratio at the same speed step. For example, the first shift ratio may be greater than the second shift ratio at the same speed step.

For example, the front left transmission 360 and the front right transmission 362 may have a shift ratio of 3:1 at the first speed and a shift ratio of 1:1 at the second speed, and the rear left transmission 460 and the rear right transmission 462 may have a shift ratio of 2:1 at the first speed and a shift ratio of 1:1 at the second speed.

When a speed of the construction machinery reach a first shift permissible speed W1, the front left transmission 360 and the front right transmission 362 may shift speed steps. When the speed of the construction machinery reach a second shift permissible speed W2 different from the first shift permissible speed W1, the rear left transmission 460 and the rear right transmission 462 may shift speed steps.

In example embodiments, when the speed of the construction machinery ranges between the first shift permissible speed W1 and the second shift permissible speed W2, the speed step of the front transmission may be different from the speed step of the rear transmission.

As illustrated in FIG. 2, in the front left electric motor 320, the front right electric motor 322, the rear left electric motor 420 and the rear right electric motor 422, an electric motor speed and a driving torque are in inverse proportion to each other. That is, the electric motor speed times the driving torque is a constant.

When the speed of the construction machinery is increased to reach the first shift permissible speed W1, the speed steps of the front left transmission 360 and the front right transmission 362 of the front axle 300 may be shifted from the first speed step to the second speed step. When the speed of the construction machinery is increased to reach the second shift permissible speed W2, the speed steps of the rear left transmission 460 and the rear right transmission 462 of the rear axle 400 may be shifted from the first speed step to the second speed step.

When the speed of the construction machinery is decreased to be equal to or less than a third shift permissible speed, the speed steps of the front left transmission 360 and the front right transmission 362 of the front axle 300 may be shifted from the second speed step to the first speed step. When the speed of the construction machinery is decreased to be equal to or less than a fourth shift permissible speed, the speed steps of the rear left transmission 460 and the rear right transmission 462 of the rear axle 400 may be shifted from the second speed step to the first speed step.

The front left transmission 360, the front right transmission 362, the rear left transmission 460 and the rear right transmission 462 may convert the driving torque generated by the front left electric motor 320, the front right electric motor 322, the rear left electric motor 420 and the rear right electric motor 422 into the conversion torque required according to the speed of the construction machinery to drive the front left wheel 310, the front right wheel 312, the rear left wheel 410 and the rear right wheel 412 respectively.

Because the construction machinery performs a high load work, the electric motor capable of producing high torque may be required. Generally, the electric motor capable of producing high torque may be relatively big and heavy. In example embodiments, the front electric motor and the rear electric motor may be relatively small and light and may have a relatively low maximum torque. These front and rear electric motors may be connected to the front transmission and the rear transmission respectively, and low driving torque may be converted into high conversion torque such that the front wheel and the rear wheel are driven by the conversion torque. Accordingly, the weight and price of the construction machinery may be decreased, and fuel efficiency and work efficiency of the construction machinery may be improved.

The sum of the torque generated by the front axle 300 and the torque generated by the rear axle 400 may satisfy a traction load required for the construction machinery. That is, in the wheel driving system according to example embodiments, the shift ratio of the transmission may be properly selected as a combination of the front transmission 1 speed step and the rear transmission 1 speed step, a combination of the front transmission 2 speed step and the rear transmission 1 speed step and a combination of the front transmission 2 speed step and the rear transmission 2 speed step, to thereby produce the optimal torque required according the speed of the construction machinery.

If the front transmission and the rear transmission have the same shift ratio, many problems during a high load work may be caused due to torque transfer interruption occurring when the speed step is shifted. In the wheel driving system in accordance with example embodiments, the front transmission may have the first shift ratio and the rear transmission may have the second shift ratio different from the first shift ratio. Additionally, when the speed of the construction machinery reaches the first shift permissible speed, the speed step of the front transmission may be shifted, and when the speed of the construction machinery reaches the second shift permissible speed different from the first shift permissible speed, the speed step of the rear transmission may be shifted.

Accordingly, the wheel driving system in accordance with example embodiments may satisfy the traction load required for the construction machinery and perform a high load work without the torque transfer interruption during shifts.

The front left wheel 310 and the front right wheel 312 may be connected to the front left transmission 360 and the front right transmission 362 through the front left drive shaft 302 and the front right drive shaft 304 respectively to be driven. The front left wheel 310 and the front right wheel 312 may support a load together with a tire (not illustrated) while transferring the conversion torque acting on the ground. Additionally, the front left wheel 310 and the front right wheel 312 may perform steering and braking functions.

The front axle 300 may further include the front drive shaft connection unit 350 configured to connect the front left drive shaft 302 and the front right drive shaft 304. For example, the front drive shaft connection unit 350 may include a differential gear.

The front drive shaft connection unit 350 may transfer the conversion torque from the central connection unit 500 as described later to the front left drive shaft 302 and the front right drive shaft 304 of the front axle 300. Additionally, the front drive shaft connection unit 350 may transfer the conversion torque from the front left drive shaft 302 and the front right drive shaft 304 to the central connection unit 500. The front left wheel 310 and the front right wheel 312 respectively connected to the front left drive shaft 302 and the front right drive shaft 304 may rotate in different angular speeds from each other by the front drive shaft connection unit 350.

The rear left wheel 410 and the rear right wheel 412 may be connected to the rear left transmission 460 and the rear right transmission 462 through the rear left drive shaft 402 and the rear right drive shaft 404 respectively to be driven. The rear left wheel 410 and the rear right wheel 412 may support a load together with a tire (not illustrated) while transferring the conversion torque acting on the ground. Additionally, the rear left wheel 410 and the rear right wheel 412 may perform steering and braking functions.

The rear axle 400 may further include the rear drive shaft connection unit 450 configured to connect the rear left drive shaft 402 and the rear right drive shaft 404. For example, the rear drive shaft connection unit 450 may include a differential gear.

The rear drive shaft connection unit 450 may transfer the conversion torque from the central connection unit 500 as described later to the rear left drive shaft 402 and the rear right drive shaft 404 of the rear axle 400. Additionally, the rear drive shaft connection unit 450 may transfer the conversion torque from the rear left drive shaft 402 and the rear right drive shaft 404 to the central connection unit 500. The rear left wheel 410 and the rear right wheel 412 respectively connected to the rear left drive shaft 402 and the rear right drive shaft 404 may rotate in different angular speeds from each other by the rear drive shaft connection unit 450.

The central connection unit 500 may be operatively connected to the front drive shaft and the rear drive shaft to transmit the conversion torque between the front axle 300 and the rear axle 400.

For example, the central connection unit 500 may be connected to the front left drive shaft 302 and the front right drive shaft 304 through the front drive shaft connection unit 350, and may be connected to the rear left drive shaft 402 and the rear right drive shaft 404 through the rear left drive shaft 402 and the rear right drive shaft 404.

The central connection unit 500 may receive the conversion torque from the rear left drive shaft 402 and the rear right drive shaft 404 through the rear drive shaft connection unit 450, and the central connection unit 500 may transmit the transferred conversion torque to the front left drive shaft 302 and the front right drive shaft 304 through the front drive shaft connection unit 350. Additionally, the central connection unit 500 may receive the conversion torque from the front left drive shaft 302 and the front right drive shaft 304 through the front drive shaft connection unit 350, and the central connection unit 500 may transmit the transferred conversion torque to the rear left drive shaft 402 and the rear right drive shaft 404 through the rear drive shaft connection unit 450.

In example embodiments, the central connection unit 500 may include a hollow steel pipe capable of enduring a strong rotational force and torsional moment. Alternatively, the central connection unit 500 may include a composite material such as alloy, carbon fiber, etc, for improving fuel efficiency or power transmission efficiency. For example, the central connection unit 500 may include a propeller shaft.

Additionally, the central connection unit 500 may be connected to the front drive shaft connection unit 350 and the rear drive shaft connection unit 450 through a universal joint (not illustrated) respectively.

The central connection unit 500 may further include a torsional vibration damper (not illustrated) configured to reduce torsion generated due to an instant difference between the average of the rotational speed of the front drive shaft (the front left drive shaft 302 and the front right drive shaft 304) and the average of the rotational speed of the rear drive shaft (the rear left drive shaft 402 and the rear right drive shaft 404). For example, when the construction machinery goes over bumpy ground, the torsional vibration damper may reduce torsion generated due to the instant difference between the average speed of the front left drive shaft 302 and the front right drive shaft 304 and the average speed of the rear left drive shaft 402 and the rear right drive shaft 404. For example, the central connection unit 500 may further include a torsional damper.

In example embodiments, the front axle 300 may further include a front left reduction gear 340 on the front left drive shaft 302 and a front right reduction gear 342 on the front right drive shaft 304. The front axle 300 may further include a front left wheel brake 330 on the front left drive shaft 302 and a front right wheel brake 332 on the front right drive shaft 304.

The rear axle 400 may further include a rear left reduction gear 440 on the rear left drive shaft 402 and a rear right reduction gear 442 on the rear right drive shaft 404. The rear axle 400 may further include a rear left wheel brake 430 on the rear left drive shaft 402 and a rear right wheel brake 432 on the rear right drive shaft 404.

The front left reduction gear 340, the front right reduction gear 342, the rear left reduction gear 440 and the rear right reduction gear 442 may reduce the rotational speeds of the front left wheel 310, the front right wheel 312, the rear left wheel 410 and the rear right wheel 412 respectively, to thereby increase torques of the front left wheel 310, the front right wheel 312, the rear left wheel 410 and the rear right wheel 412. The front left wheel brake 330, the front right wheel brake 332, the rear left wheel brake 430 and the rear right wheel brake 432 may brake the front left wheel 310, the front right wheel 312, the rear left wheel 410 and the rear right wheel 412 respectively.

As illustrated in FIG. 3, while the construction machine operates in a normal travel state, the front left electric motor 320, the front right electric motor 322, the rear left electric motor 420 and the rear right electric motor 422 may supply a torque of about 25 respectively. The front left wheel 310, the front right wheel 312, the rear left wheel 410 and the rear right wheel 412 may exert a driving torque of about 25 acting on the ground respectively while the construction machine operates.

As illustrated in FIG. 4, when the construction machine operates in a high load work state, a load may be mainly concentrated on the front axle 300, and the rear left wheel 410 and the rear right wheel 412 driven by the rear axle 400 may slip on the ground or spin with no traction thereby exerting no torque on the ground. For example, when, in a forward excavation work state of a wheel loader, a traction work state of a tractor, etc, a load is concentrated on the front axle 300, no load or a little load may be exerted on the rear axle 400, and thus, the rear left wheel 410 and the rear right wheel 412 may slip on the ground and only the front left wheel 310 and the front right wheel 312 may exert a torque on the ground respectively.

In the wheel driving system according to example embodiments, the front axle 300 and the rear axle 400 may be connected to each other by the central connection unit 500. Accordingly, the rotational speeds of the rear left wheel 410 and the rear right wheel 412 with slip on the ground may not be increased, the conversion torque generated in the rear axle 400 may be transmitted to the front axle 300 through the central connection unit 500.

In particular, the driving torque produced by the rear left electric motor 420 and the rear right electric motor 422 may be transferred to the central connection unit 500 through the rear drive shaft connection unit 450. The driving torque of about 25 may be produced by the rear left electric motor 420 and the rear right electric motor 422 respectively, and the total driving torque of about 50 may be transferred to the central connection unit 500. The total driving torque of about 50 may be transferred to the front left wheel 310 and the front right wheel 312 through the front drive shaft connection unit 350. Accordingly, when the driving torque of about 25 is produced by the front left electric motor 320, the front right electric motor 322, the rear left electric motor 420 and the rear right electric motor 422 respectively, the driving torque of about 50 may be transferred to the front left wheel 310 and the front right wheel 312 respectively.

Therefore, in case that the rear left wheel 410 and the rear right wheel 412 of the rear axle 400 do not exert the conversion torque on the ground, the conversion torque produced by the rear axle 400 may be transmitted to the front axle 300 through the central connection unit 500, to thereby reduce loads exerted on the front left electric motor 320, the front right electric motor 322, the rear left electric motor 420 and the rear right electric motor 422. Further, in case that a load is exerted on the front axle 300 or the rear axle 400, loads applied on each electric motors 320, 322, 420 and 422 may be properly distributed.

The maximum output torque for the front left electric motor 320, the front right electric motor 322, the rear left electric motor 420 and the rear right electric motor 422 may be reduced and the size and the weight thereof may be decreased. The construction machinery may be downsized, and fuel efficiency and work efficiency of the construction machinery may be improved due to light weight.

The foregoing is illustrative of example embodiments of the invention and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims

---

* Description of Reference numerals

| | |
|---|---|
| 100: engine | 102: engine output shaft |
| 200: generator | 210: combined inverter |
| 220: energy storage device | 300: front axle |
| 302: front left drive shaft | 304: front right drive shaft |
| 310: front left wheel | 312: front right wheel |
| 320: front left electric motor | 322: front right electric motor |
| 330: front left wheel brake | 332: front right wheel brake |
| 340: front right reduction gear | 342: front left reduction gear |
| 350: front drive shaft connection unit | 360: front left transmission |
| 362: front right transmission | 400: rear axle |
| 402: rear left drive shaft | 404: rear right drive shaft |
| 410: rear left wheel | 412: rear right wheel |
| 420: rear left electric motor | 422: rear right electric motor |
| 430: rear left wheel brake | 432: rear right wheel brake |
| 440: rear right reduction gear | 442: rear left reduction gear |
| 450: rear drive shaft connection unit | 460: rear left transmission |
| 462: rear right transmission | 500: central connection unit |

What is claimed is:

1. A wheel driving system, comprising:
    a generator connected to an engine and configured to generate electrical energy;
    a front axle configured to drive at least one front wheel, and including a front electric motor configured to produce a driving torque from the electrical energy supplied from the generator and a front transmission configured to convert the driving torque into a conversion torque required according to a speed of construction machinery and transmit the conversion torque to the front wheel via a front drive shaft;
    a rear axle configured to drive at least one rear wheel, and including a rear electric motor configured to produce a driving torque from the electrical energy supplied from the generator and a rear transmission configured to convert the driving torque into a conversion torque required according to the speed of the construction machinery and transmit the conversion torque to the rear wheel via a rear drive shaft; and
    a central connection unit operatively connected to the front axle and the rear axle and configured to transmit the conversion torque between the front axle and the rear axle,
    wherein at least one of the front wheel and the rear wheel comprises a left wheel and a right wheel,
    wherein at least one of the front drive shaft and the rear drive shaft comprises a left drive shaft connected to the left wheel and a right drive shaft connected to the right wheel,
    wherein at least one of the front transmission and the rear transmission comprises a left transmission and a right transmission,
    wherein at least one of the front electric motor and the rear electric motor comprises a left electric motor connected to the left drive shaft via the left transmission and a right electric motor connected to the right drive shaft via the right transmission,
    wherein the left drive shaft and the right drive shaft are connected to each other by a drive shaft connection unit, and
    wherein the central connection unit is operatively connected to the drive shaft connection unit.

2. The wheel driving system of claim 1, wherein the front transmission and the rear transmission have at least two speed steps, and the front transmission has a first shift ratio at a same speed step and the rear transmission has a second shift ratio different from the first shift ratio at the same speed step.

3. The wheel driving system of claim 2, wherein the first shift ratio is greater than the second shift ratio.

4. The wheel driving system of claim 1, wherein when the speed of the construction machinery reaches a first shift permissible speed, a speed step of the front transmission is shifted, and when the speed of the construction machinery reaches a second shift permissible speed different from the first shift permissible speed, a speed step of the rear transmission is shifted.

5. The wheel driving system of claim 1, wherein the front transmission and the rear transmission have at least two speed steps, and when the speed of the construction machinery ranges between a first shift permissible speed and a second shift permissible speed, the speed step of the front transmission is different from the speed step of the rear transmission.

6. The wheel driving system of claim 1, wherein the front drive shaft connection unit comprises a differential gear.

7. The wheel driving system of claim 1, wherein the rear drive shaft connection unit comprises a differential gear.

8. A wheel driving system, comprising:
- a generator connected to an engine and configured to generate electrical energy;
- a front axle configured to drive at least one front wheel, and including a front electric motor configured to produce a driving torque from the electrical energy supplied from the generator and a front transmission configured to convert the driving torque into a conversion torque required according to a speed of construction machinery and transmit the conversion torque to the front wheel via a front drive shaft;
- a rear axle configured to drive at least one rear wheel, and including a rear electric motor configured to produce a driving torque from the electrical energy supplied from the generator and a rear transmission configured to convert the driving torque into a conversion torque required according to the speed of the construction machinery and transmit the conversion torque to the rear wheel via a rear drive shaft; and
- a central connection unit operatively connected to the front drive shaft and the rear drive shaft and configured to transmit the conversion torque between the front axle and the rear axle,
- wherein the front transmission and the rear transmission have at least two speed steps, and
- wherein when the speed of the construction machinery reaches a first shift permissible speed, a speed step of the front transmission is shifted from a first speed step to a second speed step, and when the speed of the construction machinery reaches a second shift permissible speed greater than the first shift permissible speed, a speed step of the rear transmission is shifted from a first speed step to a second speed step.

9. The wheel driving system of claim 8, comprising:
- wherein when the speed of the construction machinery ranges between the first shift permissible speed and the second shift permissible speed, the speed step of the front transmission is different from the speed step of the rear transmission.

* * * * *